United States Patent
Vincent et al.

(10) Patent No.: US 9,088,895 B2
(45) Date of Patent: Jul. 21, 2015

(54) ESTABLISHING COMMUNICATION LINKS AUTOMATICALLY WITH LOCAL DEVICES

(71) Applicant: ARM IP Limited, Cambridge (GB)

(72) Inventors: Hugo John Martin Vincent, Cambridge (GB); Krisztian Flautner, Cambridge (GB); Amyas Edward Wykes Phillips, Cambridge (GB)

(73) Assignee: ARM IP Limited, Cambridge (GB)

( * ) Notice: Subject to any disclaimer, the term of this patent is extended or adjusted under 35 U.S.C. 154(b) by 103 days.

(21) Appl. No.: 13/987,647

(22) Filed: Aug. 19, 2013

(65) Prior Publication Data
US 2015/0050885 A1 Feb. 19, 2015

(51) Int. Cl.
*H04B 7/00* (2006.01)
*H04W 12/08* (2009.01)
*H04L 29/06* (2006.01)
*H04W 4/00* (2009.01)
(Continued)

(52) U.S. Cl.
CPC ............... *H04W 12/08* (2013.01); *H04L 63/10* (2013.01); *H04W 4/008* (2013.01); *H04W 12/04* (2013.01); *H04W 36/36* (2013.01); *H04W 52/0261* (2013.01); *H04W 84/18* (2013.01); *H04W 88/06* (2013.01)

(58) Field of Classification Search
CPC ... H04M 1/7253; H04W 84/18; H04W 88/06; H04B 5/02
USPC ................................................. 455/41.1, 41.2
See application file for complete search history.

(56) References Cited

U.S. PATENT DOCUMENTS 5,581,594 A * 12/1996 McAfee .......................... 340/7.1
6,104,913 A * 8/2000 McAllister .................... 455/41.1
(Continued)

FOREIGN PATENT DOCUMENTS

EP 1 906 294 4/2008
EP 2 557 764 2/2013
(Continued)

OTHER PUBLICATIONS

Antoniou, Z. et al., "Intuitive mobile user interaction in smart spaces via NFC-enhanced devices", IEEE Computer Society, (2007), 6 pages.
(Continued)

*Primary Examiner* — April G Gonzales
(74) *Attorney, Agent, or Firm* — Nixon & Vanderhye P.C.

(57) ABSTRACT

An envoy device for performing transactions with a further device in proximity to the envoy device, the envoy device comprising: a first communication device configured to communicate with the further device that is located within a predetermined distance of the envoy device using a local short range communication link; at least one further communication device configured to communicate with the further device using at least one longer range communication link. The envoy device is configured to respond to detecting the further device within the predetermined distance of the envoy device to: establish communication with the further device using the local short range communication link; receive information from the further device regarding any further communication links that the further device has access to; transmit to the further device information regarding the at least one longer range communication link; and to commence a transaction with the further device using the local short range communication link.

23 Claims, 12 Drawing Sheets

(51) Int. Cl.
*H04W 12/04* (2009.01)
*H04W 36/36* (2009.01)
*H04W 52/02* (2009.01)
*H04W 84/18* (2009.01)
*H04W 88/06* (2009.01)

(56) References Cited

U.S. PATENT DOCUMENTS

| | | | |
|---|---|---|---|
| 8,244,181 B2* | 8/2012 | Shuo | 455/41.2 |
| 8,330,596 B2* | 12/2012 | Tanaka et al. | 340/539.12 |
| 8,706,588 B1* | 4/2014 | Zhu | 705/35 |
| 2003/0151982 A1* | 8/2003 | Brewer et al. | 368/46 |
| 2006/0128305 A1* | 6/2006 | Delalat | 455/41.2 |
| 2008/0299907 A1* | 12/2008 | Takayama | 455/41.2 |
| 2009/0195350 A1* | 8/2009 | Tsern et al. | 340/3.1 |
| 2009/0282130 A1* | 11/2009 | Antoniou et al. | 709/220 |
| 2010/0304670 A1* | 12/2010 | Shuo | 455/41.1 |
| 2012/0309309 A1 | 12/2012 | Cho et al. | |
| 2012/0310717 A1* | 12/2012 | Kankainen | 705/14.4 |
| 2013/0124630 A1* | 5/2013 | Reunamaki et al. | 709/204 |
| 2013/0182382 A1 | 7/2013 | Vardi et al. | |
| 2014/0045547 A1* | 2/2014 | Singamsetty et al. | 455/552.1 |

FOREIGN PATENT DOCUMENTS

| | | |
|---|---|---|
| EP | 2 335 439 | 4/2013 |
| WO | WO 2010/030415 | 3/2010 |
| WO | WO 2013/021094 | 2/2013 |

OTHER PUBLICATIONS

Pulipati, M. et al., "Comparison of Various Short Range Wireless Communication Technologies with NFC", International Journal of Science and Research, vol. 2, Issue 4, (Apr. 2013), pp. 87-91.
International Search Report and Written Opinion of the International Searching Authority dated Nov. 6, 2014 in PCT/GB2014/052537, 12 pages.

* cited by examiner

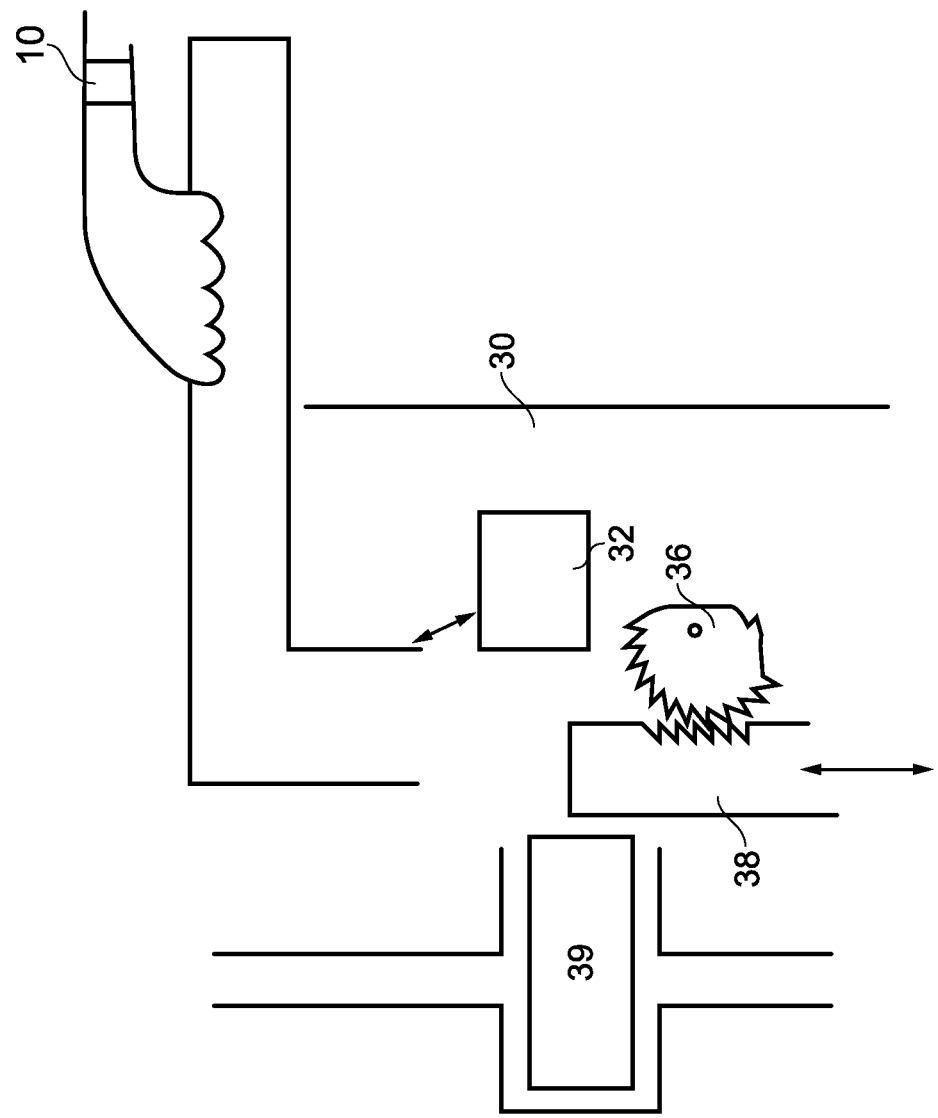

ESTABLISHING COMMUNICATION LINKS AUTOMATICALLY WITH LOCAL DEVICES

TECHNICAL FIELD

The technical field relates to the field of processing devices that can communicate and perform transactions with each other.

BACKGROUND

There are ever increasing numbers of devices within our environment that have processing and communication capabilities, which allows them to interact with other processing devices. However, connecting to these different devices and maintaining the connection during a transaction has its own challenges related to security. Furthermore, the use of different protocols and the need for authentication keys to access many communication links makes the establishment of communication between devices a challenge.

It would be desirable to be able to connect to and maintain a connection with these different devices in a straight forward user-friendly and yet secure manner.

SUMMARY

A first aspect provides an envoy device for performing transactions with a further device in proximity to said envoy device, said envoy device comprising:
a processor;
a data store;
a first communication device configured to communicate with said further device that is located close enough to said envoy device to establish a local short range communication link; and
at least one further communication device configured to communicate with said further device using at least one longer range communication link;
said envoy device being configured to respond to detecting said further device close enough to said envoy to establish said short range communication link to:
establish communication with said further device using said local short range communication link;
receive information from said further device regarding any further communication links that said further device has access to;
and
to commence a transaction with said further device using said local short range communication link.

The present invention recognises that communicating via short range communication links is generally more secure than using longer range communication links that other devices within range of these links may be able to access. Clearly the most secure sort of link is a private wired link, which also has the advantage of not requiring any manual identification or configuration. Wired connections have drawbacks of their own, however, requiring the use of appropriate connectors and forcing communicating devices to remain in a relatively fixed physical relation to one another.

The present invention seeks to combine the ease-of-use properties of the wired connection with the flexibility of wireless communications to facilitate interactions of humans with electronic devices. As increasing numbers of devices are provided with several different types of communication links as communication circuitry becomes cheaper and smaller to install, the present invention takes advantage of this and provides a system where an envoy device will automatically establish communication across a short range communication link in response to detecting a further device within communication range of this link. The envoy device will then commence a transaction with the further device using the local short range communication link.

If the short range communication link becomes inappropriate either due to an increase in distance between the two devices or due to the amount of data that is required to be transferred, then another communication link can be selected where one is available and the transaction can be finished using the other link in a manner that appears seamless to the user.

Furthermore, by transmitting information regarding the longer range communication links across the short range communication link the identity and security issues that are usually associated with establishing such communication links by two devices are to some extent circumvented as the appropriate security authentications required for the longer range links are transferred across the shorter range link that by its nature is more secure. A further advantage is that once a longer range communication has been established it can be maintained for as long as desired, and future interactions do not necessarily have to be initiated via the short range link. It should be noted that an envoy device is any processing device with communication capability. Generally it is a portable device that can be conveniently carried or worn by a user, for example a watch, or a key fob or some piece of jewellery.

A transaction in this regard may simply be an instruction sent from the envoy device to the further device. It may be initiated by a user and may for example, be an instruction or request for the further device to perform a task. Alternatively it may be a sequence of instructions that trigger a batch of communications between the devices, wherein a task or data is requested by the envoy device and the further communication device commits to performing the task or sending the batch of data.

In some embodiments the envoy device is further configured to transmit to said further device information regarding said at least one longer range communication link.

The envoy device may simply receive information from the further device regarding longer range communication links, and where it has similar capabilities, it may be able to establish such a longer range communication link later if required. Alternatively it may proactively exchange information with the further device regarding any other communication links that it has access to.

It will be appreciated that although it is expected that typically it is the envoy device that will manage transfer of an ongoing communication from short range link to longer range link, using information on those longer range links provided by said further device during the initial short range communication. In some embodiments this may be reversed. By having the envoy device share information about its own longer range links with the further device during initial short range communication, the further device can manage the continuation of communications on to the longer range link as necessary.

In some embodiments, said envoy device is configured to respond to losing connection to said further device via said short range communication link prior to said transaction having completed to determine from said received information if a connection to said further device can be made using one of said at least one further communication links and if so to establish a communication and complete said transaction; and
if not to signal to said user that said transaction has not completed.

One example of where the transaction may be completed on the different communication link is where the connection to the further device is lost via the short range link prior to the transaction having completed by for example the user that is carrying the envoy device moving away from the further device. In such as case the envoy device can determine from the received information whether the further device is a communicating device that can communicate via a longer range communication link to one of its own communication devices and if it can, it can select that communication link to complete the transaction. If it determines that they have no further communication link in common then the envoy device will signal to the user that the transaction has not completed and the user can then either decide not to complete the transaction or move back into range of the short range link until the transaction has completed.

In this way, as the transactions are initiated by proximity, which enhances security but which may not always be convenient to a user particularly where the transaction takes a significant amount of time, then where it is not convenient to a user to remain close to the further device the transaction may be able to be completed using other longer range communication links that are available in a straightforward seamless manner without input from the user, due to the proactive sending of this information by the devices across the short range communication link on connection. In this way the convenience to the user is increased while security is still maintained.

In some embodiments, said envoy device comprises a monitor configured to determine current operating conditions of said envoy device and to determine a priority for use of each of said short range and said at least one longer range communication links in dependence upon said current operation conditions, said envoy device being configured to select one of said communication links to use to complete said transaction, in dependence upon said priority.

The selection of communication link may be made when and if the short range communication link to the further device is lost. However, it may be that it is more advantageous to use one of the other links and in some cases the envoy device will have a monitor that can monitor the available links and prioritise them depending on the current operating conditions. Thus, for example if one of the longer range communication links is a link that can transmit data more quickly than the short range communication link but which is perhaps more energy intensive, then it can be selected depending on the data to be sent and the current operating conditions. For example, if the longer range link is currently operational then it may well be worth using it. However, where it is not currently operational and starting it up would be energy intensive then it may be that the current capacity of the battery at the moment does not merit this. Thus, the monitor will prioritise the different communication links and will select the appropriate one to complete the transaction in dependence on these priorities.

In some embodiments, said information received from said further device comprises at least one access key for connecting to said further device via said any further communication links and said information transmitted to said further device comprises at least one access key for connecting to said envoy device via said at least one longer range communication link.

Although the information transmitted between the devices may be a number of things, in some embodiments it includes access keys that allow connections between the devices. In this regard the access key may comprise information identifying the types of long range links available, details of those links such as channel IDs, frequencies and hopping information, cryptographic keys required to access the links such as network keys, and other information such as a transaction ID necessary to continue any higher-level transaction protocol over a different link. In some embodiments, the envoy device may transmit to said further device access keys describing and giving access to its own long range communications links.

In this regard, as noted previously accessing across longer range communication links has security implications. Furthermore, these longer range communication links may be protected from access by unauthorised devices to aid security and maintain available bandwidth to those devices that are authorised. In such cases then providing the access keys across the short range communication link enables their later use as required in a simple and very user friendly manner, while maintaining security as the short range communication link is only available to very close devices and as such communications across this link are very difficult to intercept.

In some embodiments, said information received from said further device includes an indication of at least one capability of said further device that said further device can provide to other devices, said envoy device being configured in response to receipt of said indication to select one of said at least one capability as required.

As information is being transmitted between the devices such as access keys, further information such as the capabilities of the further device that it can make available to the envoy device that it is connected to it can also be transmitted. In this way, the envoy device can determine where there are capabilities that might be useful to it and can connect to these via the communication links.

One example of a capability is an Internet connection. Thus, if the further device has a connection to the Internet it may be convenient if the envoy device can connect to the Internet via one of the communication links to the further device.

Although the local short range communication links may be a number of things in some embodiments it comprises a near field communication link which provides a low bit-rate, short range, typically centimeters, radio standard for communicating data between two devices that are in close proximity. In other embodiments it comprises a direct electrical connect through the human body. In some embodiments, said at least one longer range communication link comprises at least one of Bluetooth®, Zigbee®, WiFi® or internet protocol over some channel such as cellular.

The longer range communication link may be a number of things such as Bluetooth®, Zigbee®, WiFi® or cellular. Bluetooth® for example is part of the Bluetooth standard and provides low power low latency between several devices at up to 50 meters. Whereas WiFi® provides communications over similar lengths to a different standard and cellular provides communication over a greater distance.

In some embodiments, said envoy device is configured to indicate to said user to place said envoy device in proximity to said further device as said indication that said transaction has not completed.

Where the transaction has not completed and the short range link is not available and none of the long range communication links are also available then the indication to the user that the transaction has not completed may include instructions to place the envoy device in proximity to the further device again. In cases where the user moves out of range of the further device and there are no other communication links that can be used then in order to complete the transaction the user needs to place the envoy device close to the further device again and thus, it is convenient if this instruction is displayed to the user.

In some embodiments said envoy device is a wrist worn device, in the form perhaps of a watch, A second aspect of the present invention provides a method of performing transactions between an envoy device and a further device, said envoy device and said further device being located in proximity to each other, said method comprising the envoy device performing the steps of:

detecting said further device close enough to said envoy device to establish a local short range communication link; and establishing communication with said further device using said local short range communication link;

receiving information from said further device regarding any further communication links that said further device has access to;

and commencing a transaction with said further device using said local short range communication link.

A third aspect of the present invention provides an envoy device for performing transactions with a further device in proximity to said envoy device, said envoy device comprising:

a data store;

a processor;

a first communication device configured to communicate with said further device that is located close enough to said envoy device to establish a local short range communication link;

at least one further communication device configured to communicate with said further device using at least one longer range communication link;

a monitor configured to determine current operating conditions of said envoy device and to determine a priority of use of each of said short range and said at least one longer range communication links in dependence upon said current operation conditions;

said envoy device being configured to respond to detecting said further device close enough to said envoy to establish said short range communication link to:

establish communication with said further device using said local short range communication link;

receive information from said further device regarding any further communication links that said further device has access to; and to select one of said communication links to use to start a transaction, in dependence upon said priority determined by said monitor.

Although in the first aspect of the present invention on establishing communication with the further device as well as sending information regarding further communication links between the devices the transaction was started, in this aspect of the present invention the transaction is not automatically started using the short range communication link, rather it is determined from the monitoring device what the currently preferred communication link between the two devices given current operating conditions is and it is this link that is selected. In this way, the near field communication link is used to securely transfer information between the two devices relating to further communication links and then a selection of suitable communication links can be made depending on the current operating conditions of the device and the transaction to be completed.

The monitor may prioritise the communication links in dependence upon a number of things including current energy requirement of the communication links, a current battery capacity and current availability of the communication links.

A fourth aspect of the present invention provides an envoy means for performing transactions with a further means in proximity to said envoy means, said envoy means comprising:

a data storage means for storing data;

a processing means for processing data;

a first communicating means for communicating with said further means that is located close enough to said envoy means to establish a local short range communication link;

at least one further communicating means for communicating with said further means using at least one longer range communication link;

said envoy means responding to detecting said further means close enough to said envoy to establish said short range communication link to:

establish communication with said further means using said local short range communication link;

receive information from said further means regarding any further communication links that said further means has access to; and to commence a transaction with said further means using said local short range communication link.

The above, and other objects, features and advantages of this invention will be apparent from the following detailed description of illustrative embodiments which is to be read in connection with the accompanying drawings.

BRIEF DESCRIPTION OF THE DRAWINGS

FIG. 5a schematically shows the opening of a lock by a person wearing an envoy device according to an embodiment of the present invention;

FIG. 5b shows the display screen on the envoy device of FIG. 5a;

DESCRIPTION OF THE EXAMPLE NON-LIMITING EMBODIMENTS

Figure 1:
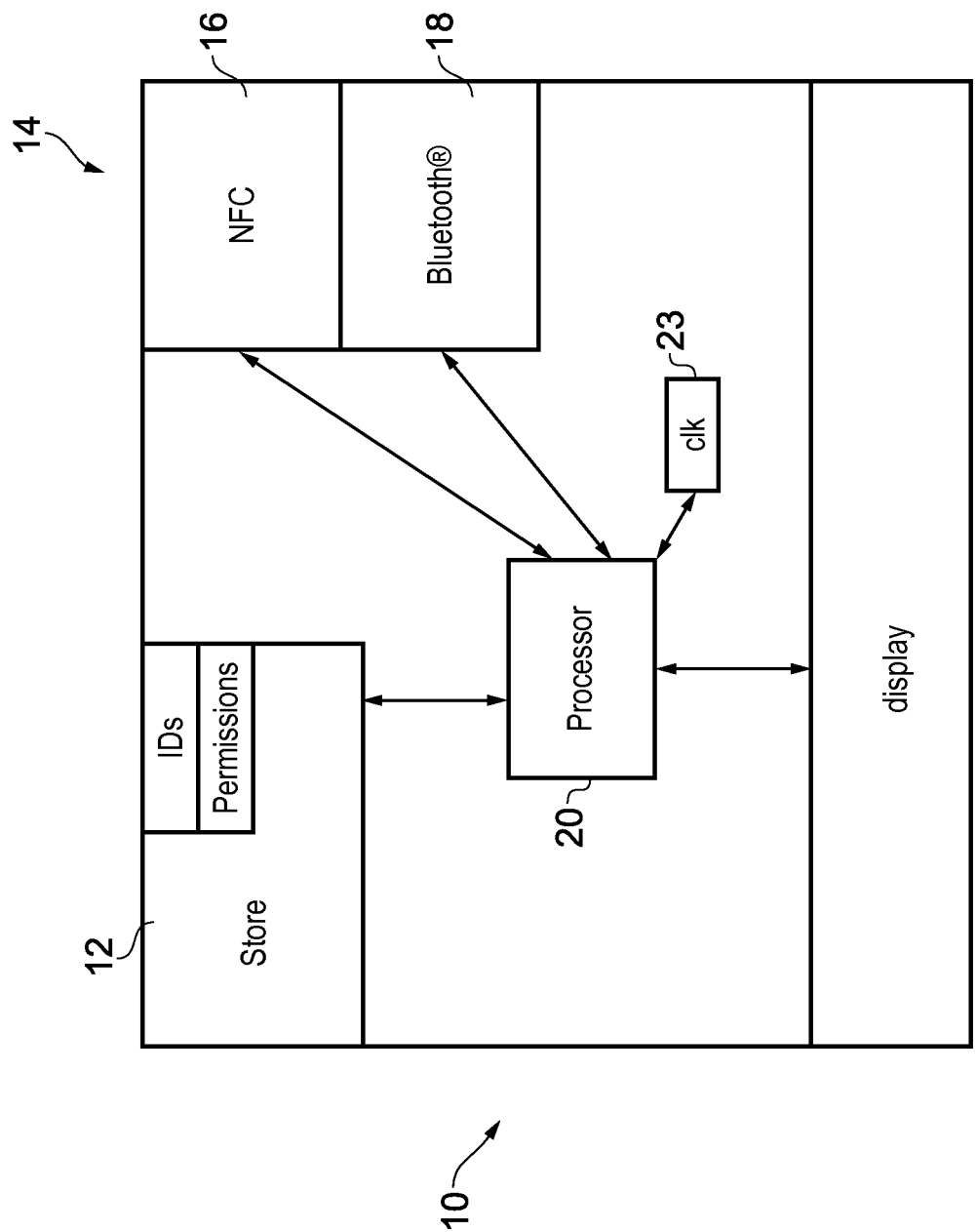
FIG. 1 schematically shows an envoy device according to an embodiment of the present invention.

FIG. 1 shows an envoy device 10 according to an embodiment of the present invention. Envoy device 10 has a data store 12 which stores data including permissions such as keys to locks, passwords to computing devices and information data regarding the owner of the device. There is also communication circuitry 14 including a near field communicating device 16 and a Bluetooth communicating device 18. A processor 20 controls these devices and also communicates with the display 22 for displaying information to the user.

This envoy device 10 is a portable device that is carried by the user and is used to interact with other devices that are found within the user's environment. These may be embedded devices located within various objects such as locks within doors, locks within cars including ignition locks or access barriers to train stations. They may also be other devices that can be controlled such as light switches, power outlets, computing devise that require a login ID or thermostats in heating devices. The envoy device 10 is configured to be able to communicate with these devices and to perform transactions with them such that they are controlled by the user in a straightforward manner using the envoy device. Furthermore, where security is an issue the secure permissions may be stored within the envoy device and transmitted automatically to the further device such that the appropriate access is granted to the user without the need for the user to memorise any passwords.

FIG. 1 also shows clock 23 that provides an indication of a current time. In some embodiments the envoy device is a watch and thus it needs to display the current time. The time may also be used by processor 20 to determine the validity of certain permissions stored within data store 12. In this regard, some of the permissions may have a lifetime associated with them such that they expire at a certain time. Having a clock 23 within the envoy device enables these permissions to be managed such that when they expire they can be deleted or marked as currently invalid. This allows permissions to be granted to such devices with a limited lifetime, for example permission to access a particular building having a lifetime of 12 hours may be granted to someone. This may be useful as a key to a hotel room for example. Clock 23 is a reliable clock which communicates with a radio clock intermittently to update its time.

Figure 2:
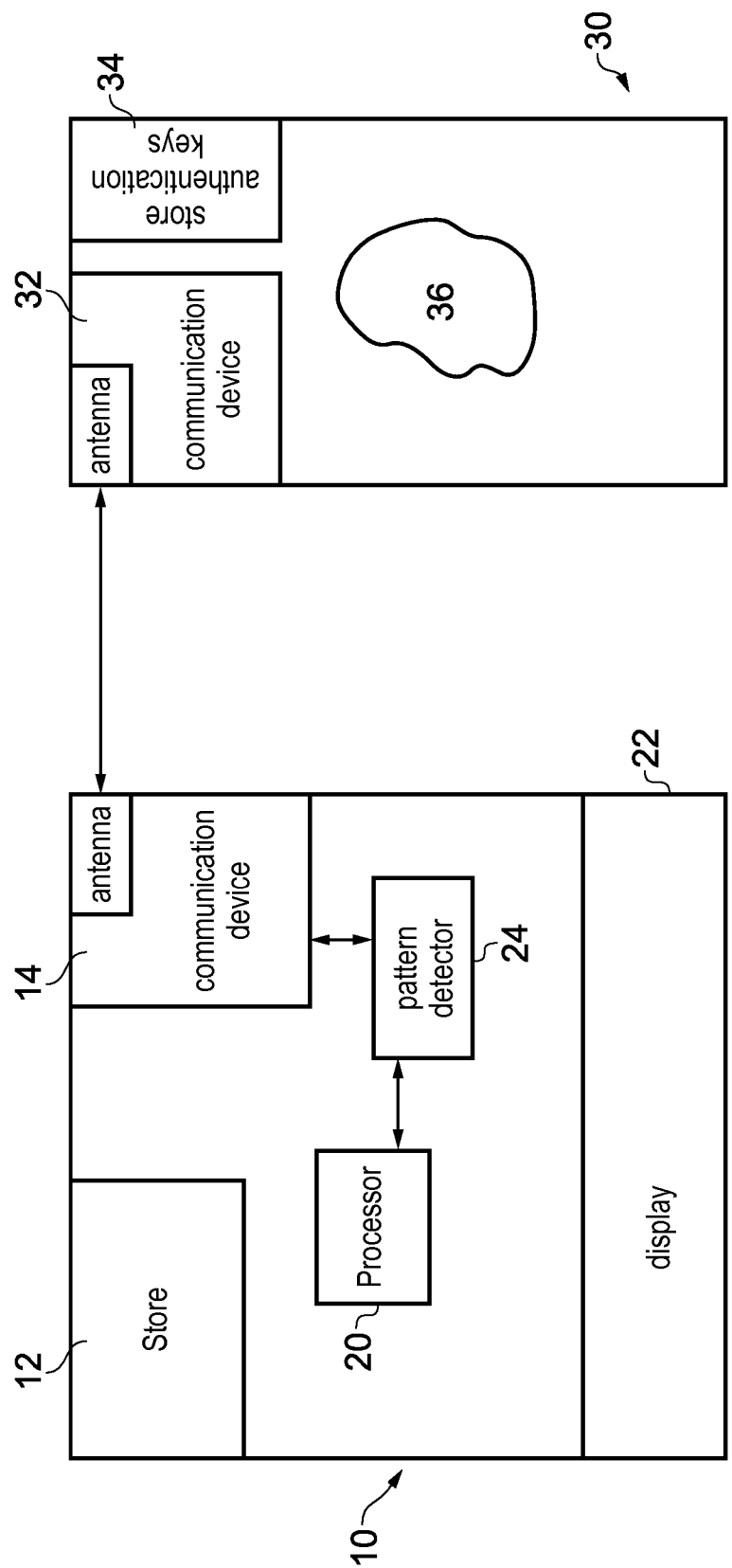
FIG. 2 schematically shows an envoy device and a further device according to an embodiment of the present invention.

FIG. 2 shows envoy device 10 communicating with a further device 30. Envoy device 10 is similar to the envoy device shown in FIG. 1 but further has a pattern detector 24 for detecting a pattern of movement of the envoy device with respect to the further device 30. In this regard, in some cases the envoy device is configured to automatically initiate a transaction with the further device simply when it is detected to be within a predetermined distance of that further device. In other cases the requirement to initiate the transaction may be that it is within a predetermined distance and it performs a predetermined pattern of movement. The pattern detector 24 is for detecting that pattern of movement.

In this regard, it may be advantageous if transactions are only initiated with the intent of the user such that it is not sufficient for the envoy device simply to pass within a predetermined distance of the further device but a particular pattern of movement must also be detected which indicates the intent of the user to interact with the device. The type of movement is selected not to be the sort of movement that might happen accidentally. In this way, the transaction can be deliberately started by the user in a simple straightforward manner. A pattern of movement may be simply moving the device towards the further device and away again in what is termed a "bump" movement.

FIG. 2 also shows further device 30 that also has communication circuitry 32 and a data store 34 for storing various information and for storing authentication keys for the communication circuitry. It also has further circuitry 36, that may be an actuator be for actuating a locking device for example or it may have some switching device for turning on or off a heater, a power outlet, a light switch or some other such controllable device.

Figure 3:
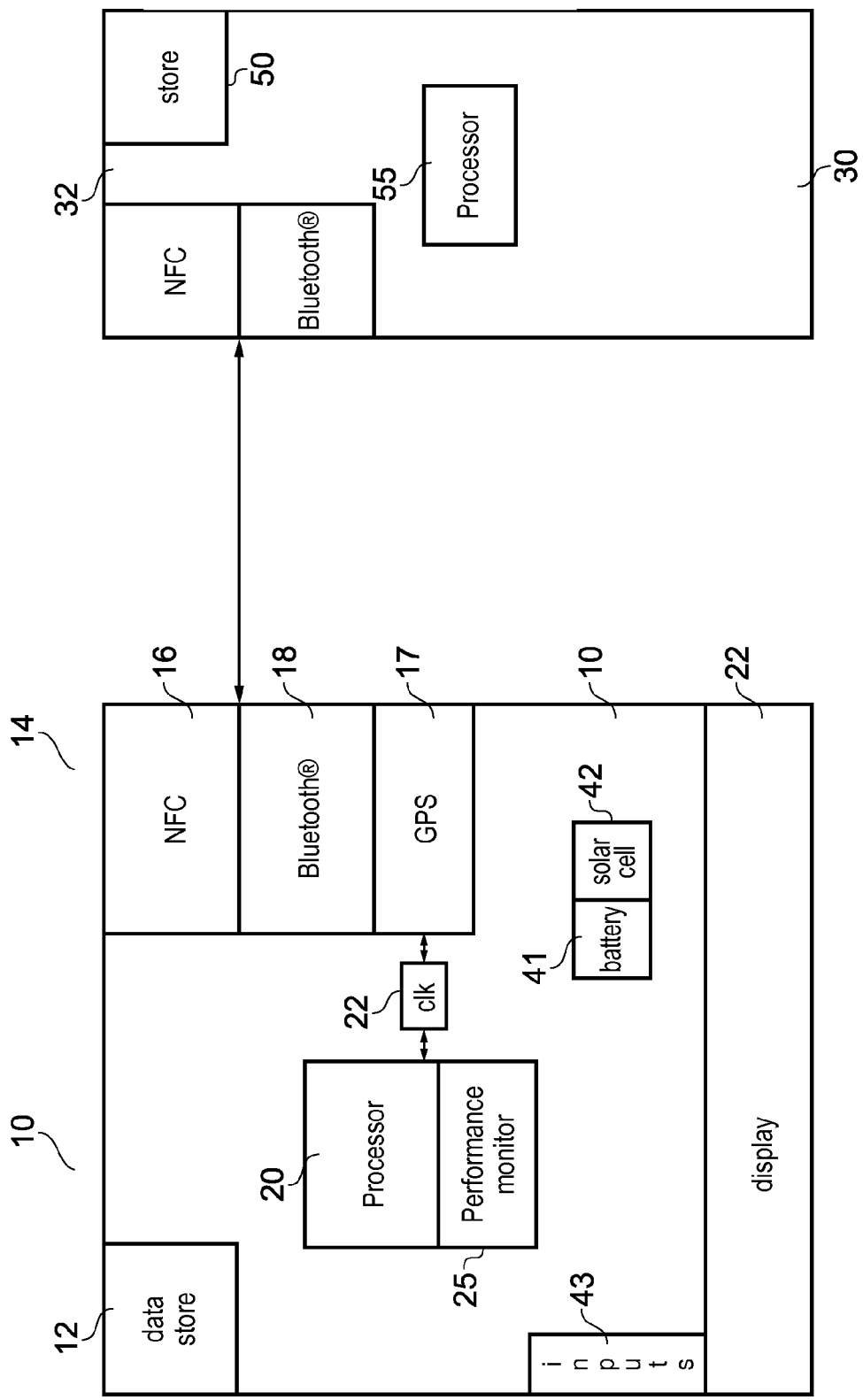
FIG. 3 schematically shows an envoy device and a further device according to a further embodiment of the present invention.

FIG. 3 shows a further example of an envoy device 10 and further device 30 according to an embodiment of the present invention. Envoy device 10 has a processor 20 for controlling the operations of the envoy device, a performance monitor 25 which monitors the operating conditions of the envoy device and determines the battery 41 capacity and the current operating states of the communication devices 16 and 17. The device also has data store 12 for storing data such as access keys for communication links and various permissions such as keys to locking devices and travel tickets that the envoy device provides access to.

There is also a display 22 of limited size for displaying in this case a single icon or a few lines of text. There is a battery 41 which is an extremely long life battery and which is supplemented by solar cells 42. There is also a user input device 43 for receiving user inputs. In this regard, the user may select an item on the display or may scroll through the display such that a list of selectable items are shown one after the other.

There is also a clock device 23 which receives signals from a GPS device 17 within communication circuitry 14. These signals are used to update the clock periodically to ensure that it has the correct time. This is important as the clock is used to determine when some of the permissions stored in data store 12 expire.

Envoy device 10 is configured to communicate with further device 30 when it is placed in close physical proximity to it. The further device 30 has communicating circuitry 32 including a near field communicating device and a Bluetooth® communicating device. There is also a data store 50 and a processor 55.

When envoy device 10 is placed in close physical proximity to further device 30 then a near field communication link is set up between the two devices and they exchange information with each other proactively regarding what other communication links they have access to and any access keys to these communication links. Thus, in this case they will both transmit to the other one that they have a Bluetooth communication link and they will transmit the keys that are required to access each other via that link. A transaction request will then be transmitted from envoy device 10 to the further device 30 across the near field communication link and this transaction will be initiated.

Now it may be that this transaction takes some time to complete and that during this time the user moves out of range of the near field communication link such that the transaction cannot complete across this link. In such a case, processor 20 will look at the received information and determine that there is a Bluetooth® link available to which it has the access key. It will then transmit a signal requesting access to that Bluetooth® communication link and the link will be made between the two devices as they both carry each other's authentication keys. The transaction can then complete across the Bluetooth® link without the user having to move back into close proximity to the further device.

In other embodiments, rather than the transaction automatically starting using the near field communication link it may be that the processor 20 controls which link to use using information from the performance monitor 25. In this regard, the performance monitor 25 will monitor current operating conditions of envoy device 10 and depending on the transaction will select the appropriate link for the transaction to be performed via. Thus, it may be that it determines that the Bluetooth® communication circuitry is already active and communicating with a device. In this case, it may not require much additional energy to use this Bluetooth® communication link to communicate with the further device and this may in fact be more energy efficient that continuing to keep the near field communication channel active. Thus, it may decide to perform the transaction using the Bluetooth® link. In other cases, it may determine that the Bluetooth® communication circuitry is not active and it will be more energy efficient to maintain the near field communication link where possible and to complete the transaction using this.

In some cases, the further device communicated with may not have a Bluetooth link and thus, it may be that the near field communication link is the only link that can be used and when the envoy device and further device are no longer connected due to the envoy device moving out of range of the near field communication link then a signal will be sent to the user via the display 22 that the transaction cannot be completed and that the user should move back into proximity with the further device such that it can complete the transaction.

Figure 4:
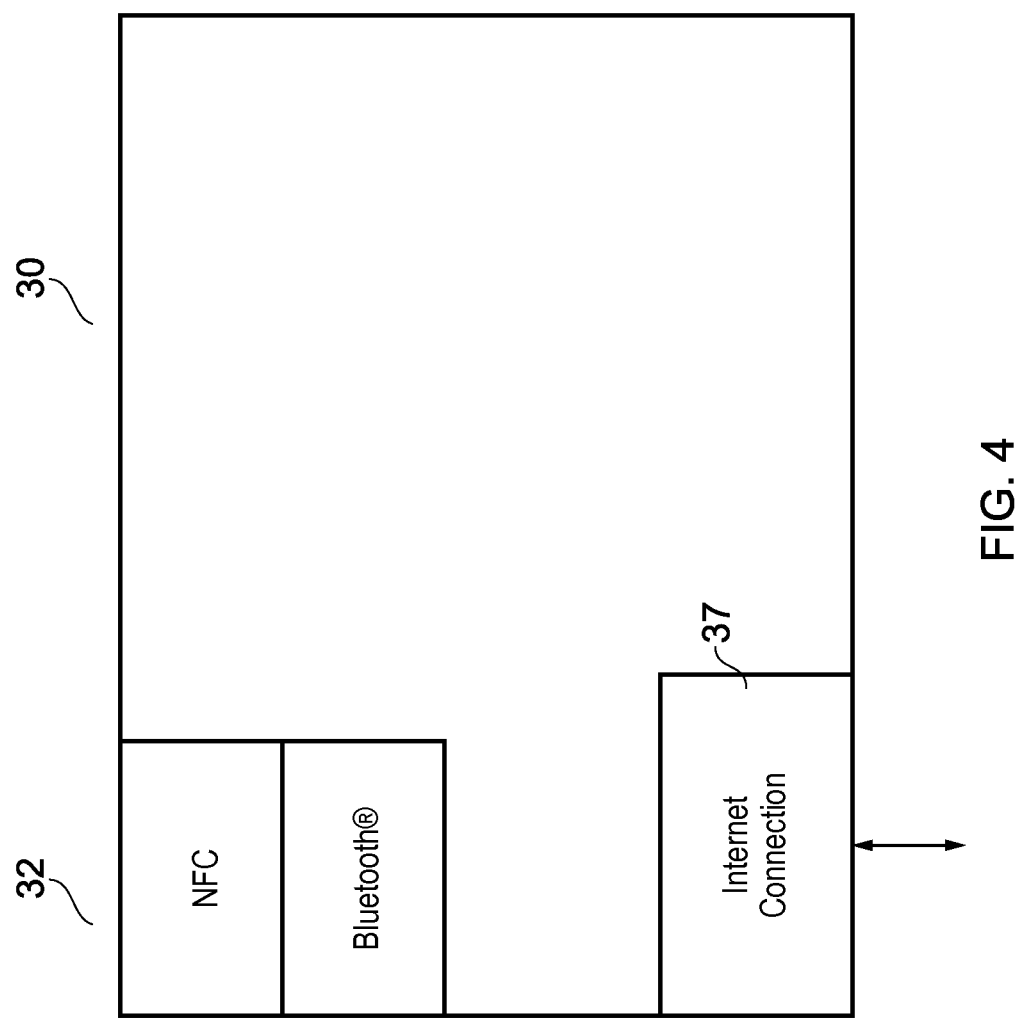
FIG. 4 schematically shows a further device having access to the internet.

FIG. 4 shows an alternative embodiment where further device 30 has an internet connection 37. In this embodiment when the initial link is set up between the devices using the near field communication link and details of the various communication links are passed between the two devices the further device 30 also advertises its capabilities to the envoy device 10 and in this case it advertises that it has a link to the internet by internet link 37. The envoy device can then store this information in its data store and if it has pending intents to access the internet it can connect to the internet via the further device and can complete these intents. It can also display to the user that the internet is available if the user wishes to input a new intent. In this regard, intents are transactions that the user has indicated he wishes to perform but which have not yet been performed due to lack of availability of resources to perform these transactions or which have not yet completed. These are stored within the device as pending intents and on forming a communication link with a further device it is determined whether the further device can process these intents and where it can the transactions are initiated.

FIG. 5a shows an example of the envoy device being worn by a user as a watch device. In this case the further device 30 is located within a door locking mechanism and the touching of the door handle by the user when wearing the envoy device 10 indicates that the envoy device is within the predetermined physical proximity of the further device and triggers initiation of a transaction. In this regard, the envoy device 10 detects the touching by the user of the door handle 40 when signals from the envoy device 10 pass through the body of the user to the communicating device 32 of the further device and are received and a response is sent from the communicating device 32.

The envoy device 10 and further device 32 exchange information and in particular, the envoy device 10 transmits a permission to the further device 30 indicating that it has a stored key to that particular locking device and in response to receiving this the actuating device 36 within the locking mechanism drives the blocking bar 38 such that the locking mechanism 39 is released. In this way, the touching by the user of the handle 40 when wearing the envoy device 10 as a watch is sufficient to free the lock and allow access to the room. Although, in this embodiment the watch is shown as being on the hand that touches the door handle it is sufficient that the user is wearing the device on any part of the body when one part of the body touches the door handle.

Once the lock has been released the display 22 on the envoy device 10 displays a "coda" showing a set of keys related to this locking device. This is shown for 15 seconds after use of the lock and enables the user to select this set of keys and perform actions with them in a straightforward manner.

Figure 5B:
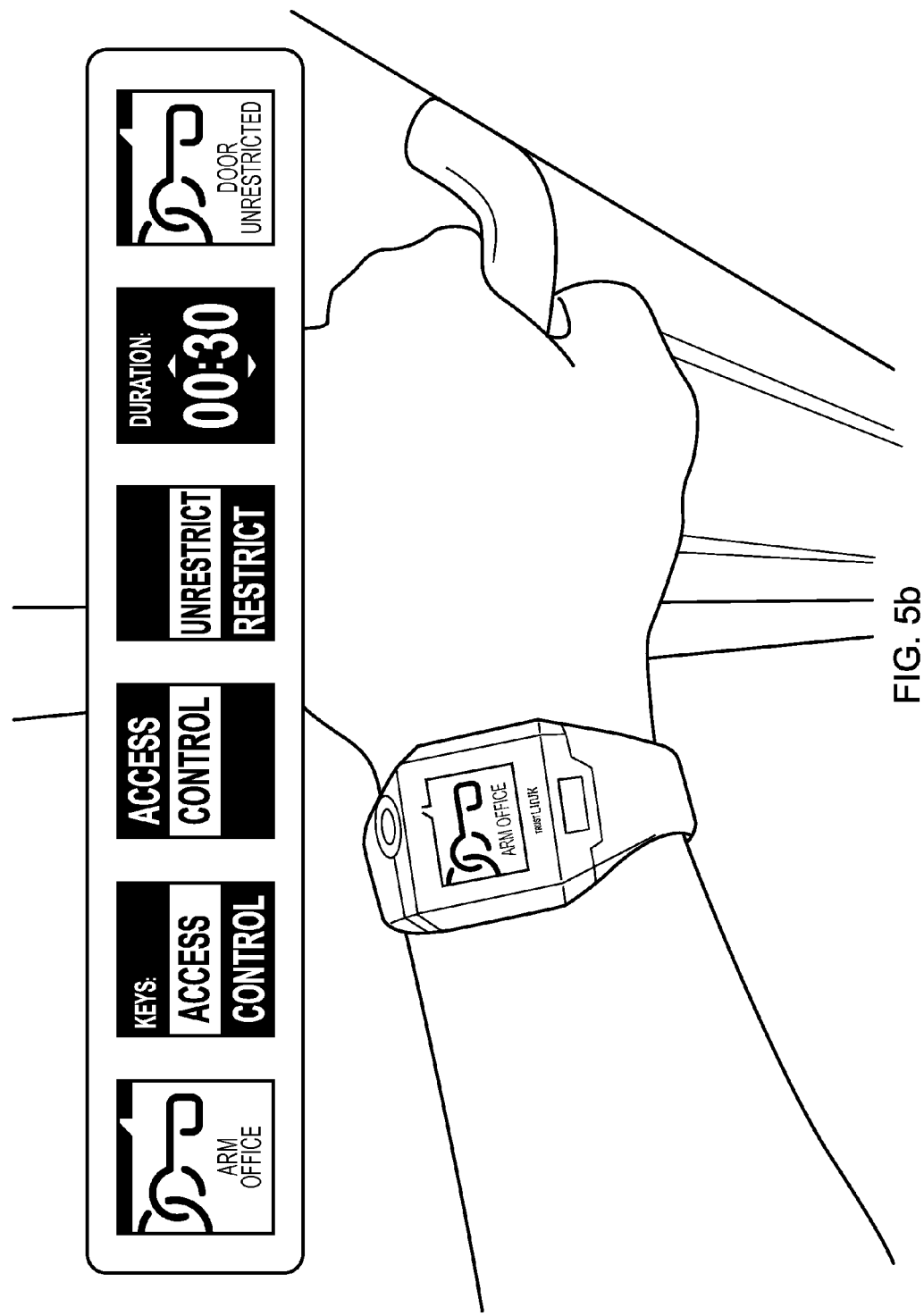

FIG. 5b shows examples of the "codas" displayed by the watch following the user touching the door and the access transaction completing. These illustrate the various selections that it is considered the user is likely to require.

Thus, following completion of the transaction a coda illustrating a set of keys is displayed and the user can select the displayed coda which relates to the set of keys and a display illustrating access and control is then provided so that he can then select either access which brings up the access key which he may want perhaps to select send to his friend or control which brings up a display of a control key which has further different permissions. Thus, he may select a control key that would allow the door to remain unlocked for perhaps the next 30 minutes.

If he had selected an access key to send to a friend then this would sit as a pending intent on his envoy device until the envoy device was able to connect with the internet whereupon the key would be sent via the cloud to his friend and the transaction would complete.

Figure 5C:
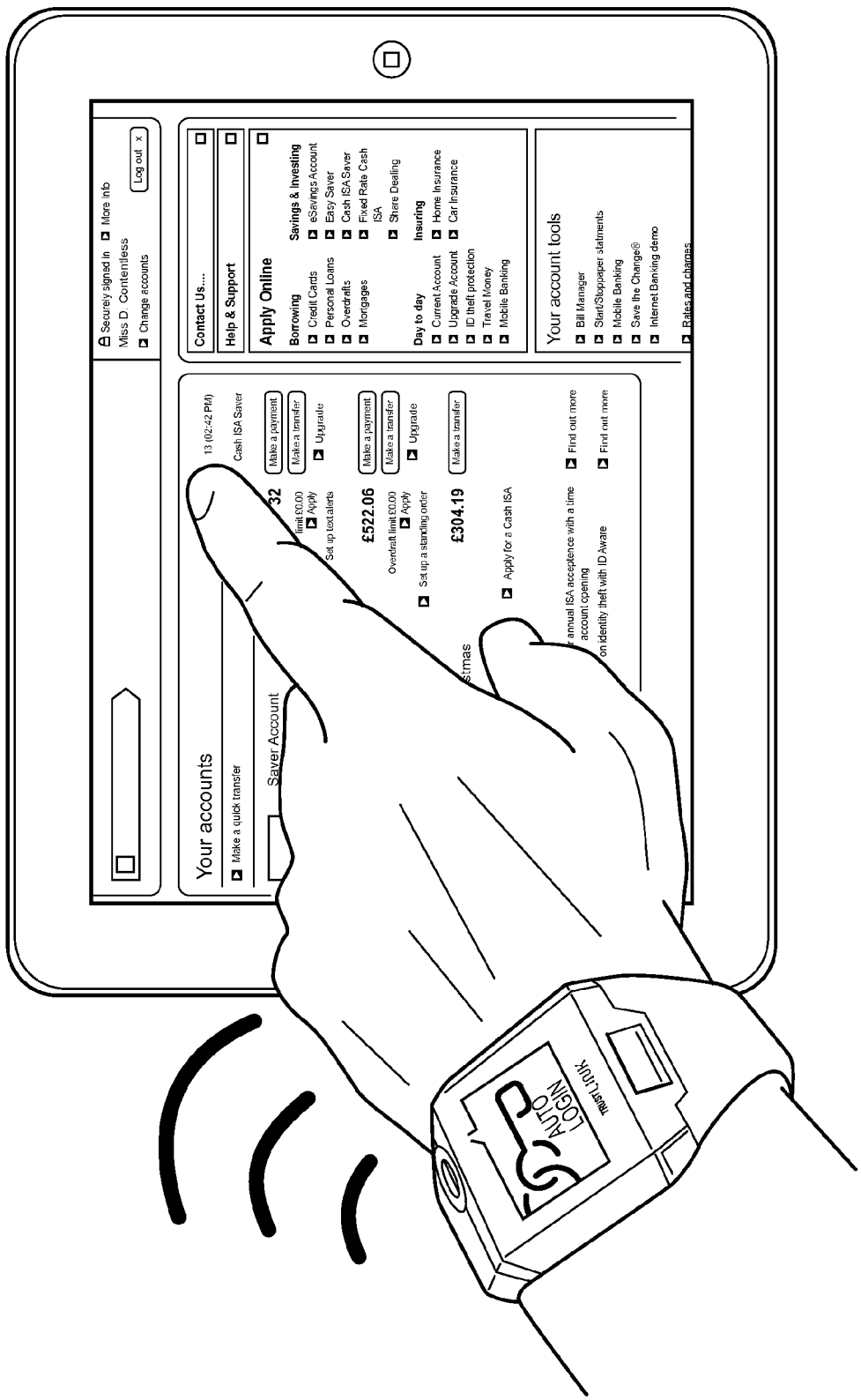
FIG. 5c shows an envoy device worn by a user providing an automatic login to a notebook.

FIG. 5C shows a further example of an envoy device being worn by a user. In this case the further device is a notepad device, and the envoy device has permissions stored within it for logging on to the notepad device and also for accessing various secure sites accessible via the notepad device. Thus, on detecting the notepad device in proximity to it, the envoy device will initiate communication via a near field communication link and the devices will proactively transfer details of any other communication links that they have access to. The envoy device will detect that it has permissions stored relating to the notepad device and will initiate a log on to that notepad device. In this way simply by placing the envoy device close to the notepad the user will automatically be logged on to this. The envoy device may then display automatic log on transactions to various sites accessible via the notepad that the user can select if he wishes to access these sites. Again as all the login information is stored within the envoy device the login can be performed automatically without the need for the user to remember the passwords or indeed perform any further actions.

Figure 6:
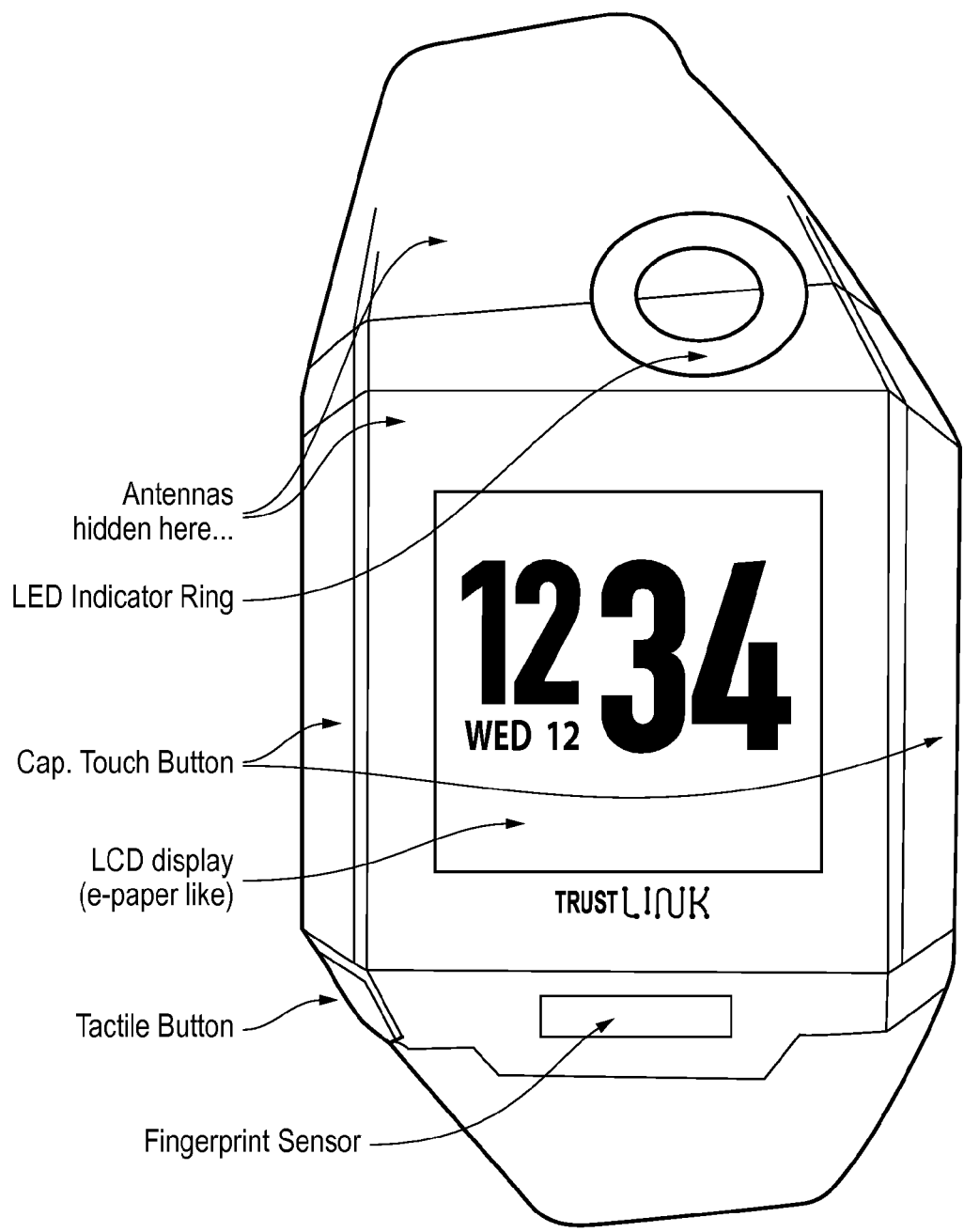
FIG. 6 shows a schematic representation of the display and other features of an envoy device according to an embodiment of the present invention.

FIG. 6 shows an envoy device 10 in the form of a watch having a display that displays the time and date. A fingerprint detector is provided for security reasons such that a user can be securely identified, antenna placements where the antennas are hidden to transmit both near field and some other communication perhaps Bluetooth® or Wi-Fi® from an LED indicator room and some different buttons and sliders for use by the user who may wish to scroll between different displays.

Figure 7:
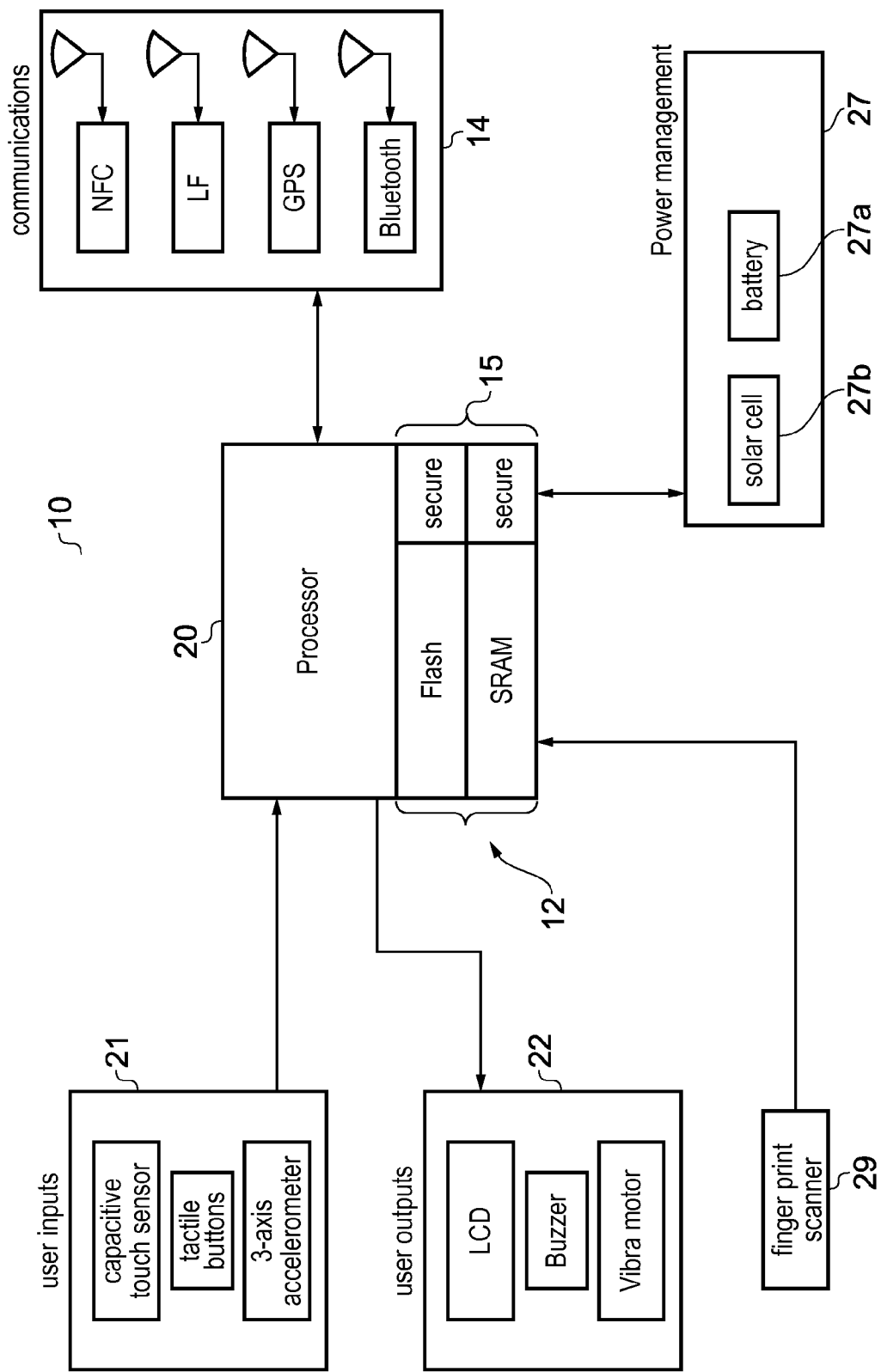
FIG. 7 shows the circuitry inside an envoy device according to an embodiment of the present invention.

FIG. 7 shows envoy device 10 in more detail with communication circuitry 14 having various communication capabilities, data store 12 having a secure portion 13 for storing authentication keys and other secure data and a non-secure portion 15, a central processor 20, user inputs 21 and user outputs 22 which are in the forms of buzzers, a vibra motor and an LCD display. There is also power management circuitry 27 for determining the capacity of the battery 27a and for selecting things such as a particular communication link in dependence upon the current power usage and requirements. There is also a solar cell 27b for recharging the lithium-ion battery 27a.

In this case there is also finger print scanner 29 for securely identifying the user.

Figure 8:
FIG. 8 shows some example codas that are displayed following completion of a transaction according to an embodiment of the present invention.

FIG. 8 shows an example of a coda which is displayed following a transaction, in this case the user has just received a car key from a car rental company. This is the screen shown after the initial iconographic display, which is displayed after the user has scrolled down or interacted in some way with the device. These are related to the transaction that has just completed and represent transactions that it is predicted a user may wish to select next, such that this selection is made easier. A list of previously displayed codas is also available to the user via a few user inputs.

In this example, the previous transaction that has just completed is shown at the top and then there a list of items displayed that are associated with the previous transaction and that it is predicted that a user may wish to use next. Thus, there is a "see details" options which allows one to see details of the car, a "share key" options which allows one to provide the key to someone else, a co-driver perhaps and a "see all keys" which allows one to access all keys that are currently available via the device.

The items shown are those associated with the previous transaction and that it is likely that user may wish to select next. This list of items may be updated using a learning process such that if following a particular transaction a user is found to often perform a certain other transaction that is not currently on the list, then this may be added to the list in place of an item that is not usually selected. Alternatively the list may be statically generated and the device may always show the same list of items associated with the completed transaction and that it is predicted that a user may select next.

Figure 9:
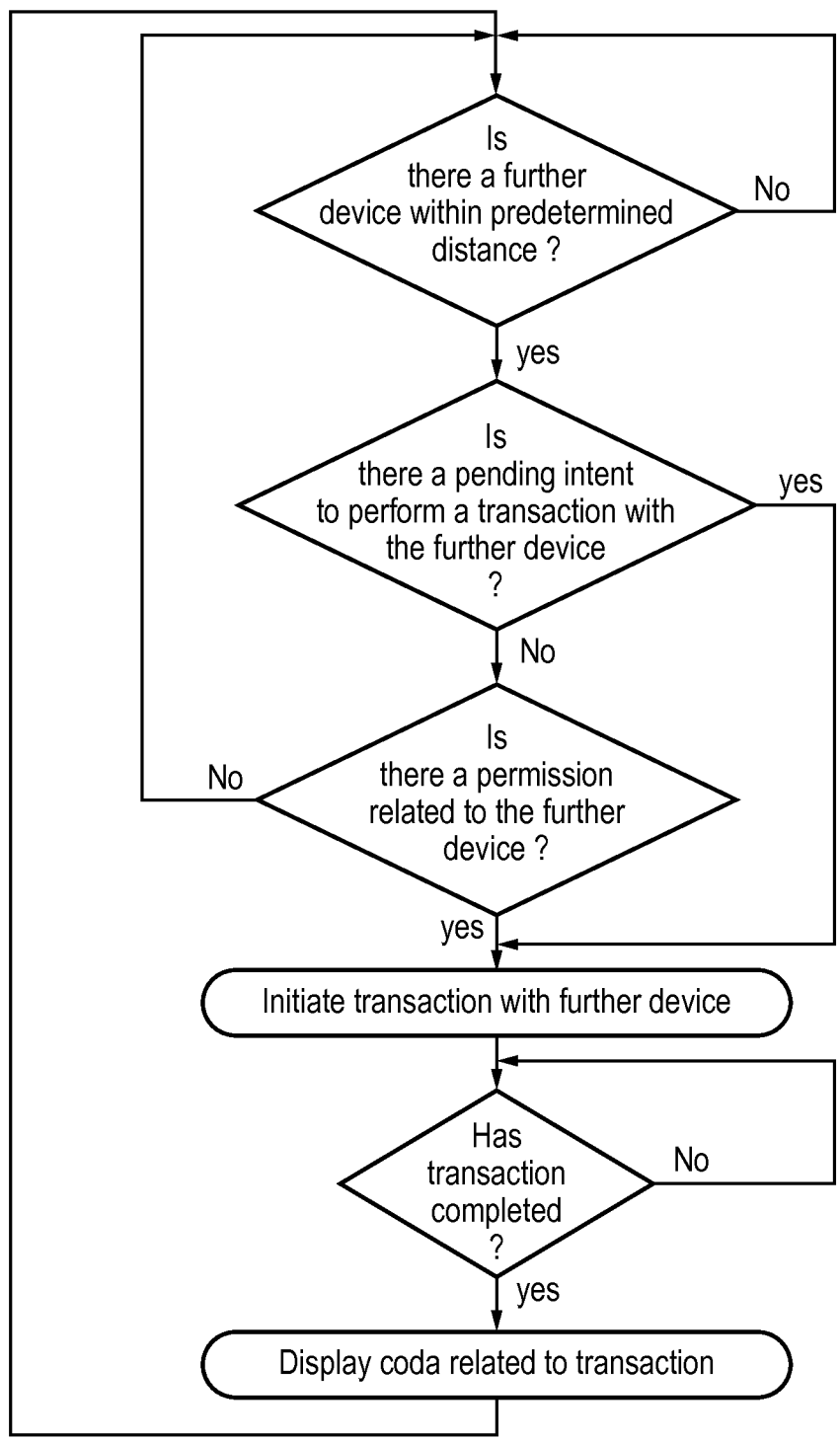
FIG. 9 shows a flow diagram illustrating steps in a method according to one technique.

FIG. 9 shows a flow diagram illustrating steps in a method for initiating a transaction with a local further device. Thus initially the envoy device determines whether there is a further device within a predetermined distance. It may do this by determining whether a further device is plugged into it or determining when it is in near field communication with a further device or determining when a user wearing the envoy device has touched the further device. In some cases there may be an additional step performed at this point of detecting whether the envoy device has performed a predetermined pattern of movement when within the predetermined distance.

If it determines that the device is within the predetermined distance (and if required that the predetermined pattern of motion has been detected), it is then determined if there is a pending intent to perform a transaction with the further device.

If there is then that transaction is initiated. If there isn't then it is determined if there is a pending permission related to the further device. If there isn't then no transaction is initiated and the envoy device returns to determining again if there is a further device within the predetermined distance.

If there is a pending permission relating to the further device then a transaction is started with that further device that relates to this permission. When it is determined that the transaction has completed then a coda is displayed which relates to the transaction and is generally a transaction that it is predicted the user may wish to select next.

Figure 10:
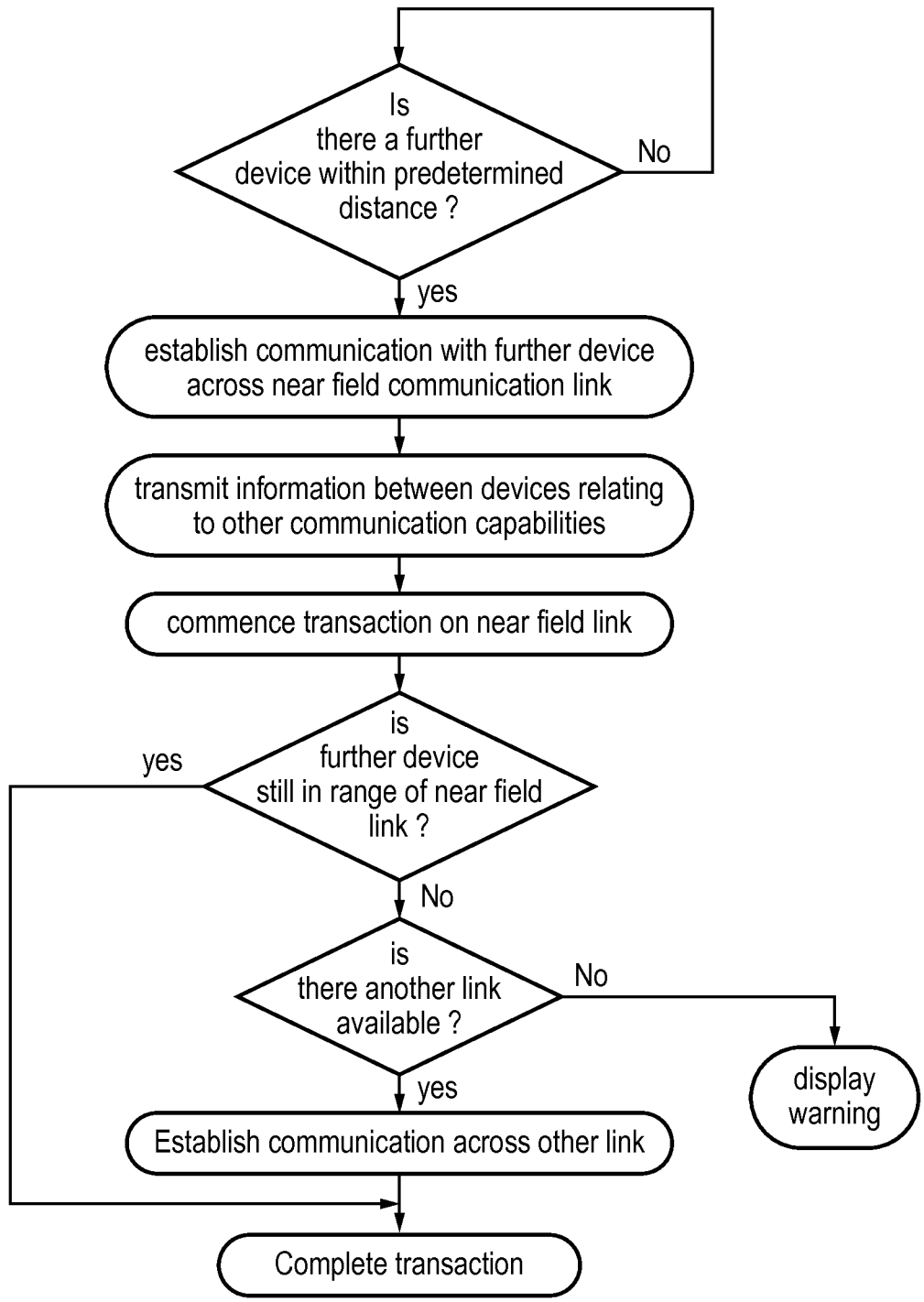
FIG. 10 shows steps in a method according to a further technique.

FIG. 10 shows a flow diagram illustrating steps in a method for establishing communication with a local further device. There is an initial step of detecting whether the further device is within a predetermined distance of the envoy device. If a further device is detected within this distance then communication with the further device is established using a local near field communication link. Information is then sent from the further device to the envoy device regarding any further communication links that the further device has access to and information is sent from the envoy device to the further device indicating information regarding any other communication links that the envoy device has access to. A transaction is then commenced with the further device using the near field communication link.

If the envoy device moves out of range of the near field link, then it is determined if there is another link available. If not a warning is displayed to the user indicating that he transaction cannot complete and the user should move back into range of the further device. If there is a further link then communication is established across this link using information transmitted between the devices using the near field link and the transaction is completed.

In some embodiments, rather than commencing the transaction with the further device using the local near field communication link a communication link is selected in dependence upon the information from a performance monitor which prioritises the links and a link is selected to commence the transaction with that has the highest priority of the available links. In this case generally the transaction is completed using this link unless the link becomes unavailable for some reason or the performance monitor determines that the current operating conditions of the device is such that this link no longer has a higher priority than other available links.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

We claim:

1. An envoy device for performing transactions with a further device in proximity to said envoy device, said envoy device comprising:
   a data store;
   a processor;
   a first communication device configured to communicate with said further device that is located close enough to said envoy device to establish a local short range communication link; and
   at least one further communication device configured to communicate with said further device using at least one longer range communication link;
   said envoy device being configured to respond to detecting said further device close enough to said envoy to establish said short range communication link to:
      establish communication with said further device using said local short range communication link;
      receive information from said further device regarding any further communication links that said further device has access to;
      to commence a transaction with said further device using said local short range communication link,
   said envoy device being further configured to respond to losing connection to said further device via said short range communication link prior to said transaction having completed to determine from said received information if a connection to said further device can be made using one of said at least one further communication links and if so to establish a communication and complete said transaction, and if not to signal to said user that said transaction has not completed.

2. An envoy device according to claim 1, said envoy device being further configured to transmit to said further device information regarding said at least one longer range communication link.

3. An envoy device according to claim 1, wherein said information received from said further device comprises at least one access key for connecting to said further device via said any further communication links.

4. An envoy device according to claim 2, wherein said information transmitted to said further device comprises at least one access key for connecting to said envoy device via said at least one longer range communication link.

5. An envoy device according to claim 1, wherein said information received from said further device includes an indication of at least one capability of said further device that said further device can provide to other devices, said envoy device being configured in response to receipt of said indication to select one of said at least one capability as required.

6. An envoy device according to claim 5, wherein one of said at least one capability comprises a connection to the Internet.

7. An envoy device according to claim 1, wherein said local short range communication link comprises a near field communication link.

8. An envoy device according to claim 7, wherein said at least one longer range communication link comprises at least one of Bluetooth, Zigbee, WiFi or cellular.

9. An envoy device according to claim 1, wherein said envoy device is configured to indicate to said user to place said envoy device in proximity to said further device as said indication that said transaction has not completed.

10. An envoy device according to claim 1, wherein said envoy device is a wrist worn device.

11. An envoy device for performing transactions with a further device in proximity to said envoy device, said envoy device comprising:
a data store;
a processor;
a first communication device configured to communicate with said further device that is located close enough to said envoy device to establish a local short range communication link; and
at least one further communication device configured to communicate with said further device using at least one longer range communication link;
said envoy device being configured to respond to detecting said further device close enough to said envoy to establish said short range communication link to:
establish communication with said further device using said local short range communication link;
receive information from said further device regarding any further communication links that said further device has access to
to commence a transaction with said further device using said local short range communication link,
said envoy device comprising a monitor configured to determine current operating conditions of said envoy device and to determine a priority for use of each of said short range and said at least one longer range communication links in dependence upon said current operation conditions, said envoy device being configured to select one of said communication links to use to complete said transaction, in dependence upon said priority.

12. A method of performing transactions between an envoy device and a further device, said envoy device and said further device being located in proximity to each other, said method comprising the envoy device performing the steps of:
detecting said further device close enough to said envoy device to establish a short range communication link;
establishing communication with said further device using said local short range communication link;
receiving information from said further device regarding any further communication links that said further device has access to;
commencing a transaction with said further device using said local short range communication link,
wherein the method further comprises the steps of:
determining current operating conditions of said envoy device and prioritising use of each of said short range and said at least one longer range communication links in dependence upon said current operation conditions;
selecting a communication link to use to complete said transaction in dependence upon a priority of said communication links determined by said determining step.

13. A method according to claim 12, and further comprising:
transmitting to said further device information regarding at least one longer range communication link that said envoy device has access.

14. A method according to claim 12, wherein said information received from said further device comprises at least one access key for connecting to said further device via said any further communication links.

15. A method according to claim 13, wherein said information transmitted to said further device comprises at least one access key for connecting to said envoy device via said at least one longer range communication link.

16. A method according to claim 12, wherein said information received from said further device includes an indication of at least one capability of said further device that said further device can provide to other devices, said method comprising a further step of in response to receipt of said indication, selecting one of said at least one capability as required.

17. A method according to claim 16, wherein one of said at least one capability comprises a connection to the Internet.

18. A method of performing transactions between an envoy device and a further device, said envoy device and said further device being located in proximity to each other, said method comprising the envoy device performing the steps of:
detecting said further device close enough to said envoy device to establish a short range communication link;
establishing communication with said further device using said local short range communication link;
receiving information from said further device regarding any further communication links that said further device has access to;
commencing a transaction with said further device using said local short range communication link,
wherein the method further comprises the steps of:
losing connection to said further device via said short range communication link prior to said transaction having completed;
determining from said received information if a connection to said further device can be made using one of said at least one further communication links and if so:
establishing a communication and completing said transaction; and if not
signalling to said user that said transaction has not completed.

19. An envoy device for performing transactions with a further device in proximity to said envoy device, said envoy device comprising:
a data store;
a processor;
a first communication device configured to communicate with said further device that is located close enough to said envoy to establish a local short range communication link;

at least one further communication device configured to communicate with said further device using at least one longer range communication link; and a monitor configured to determine current operating conditions of said envoy device and to determine a priority of use of each of said short range and said at least one longer range communication links in dependence upon said current operating conditions;

said envoy device being configured to respond to detecting said further device close enough to said envoy to establish said short range communication link:

establish communication with said further device using said local short range communication link;

receive information from said further device regarding any further communication links that said further device has access to; and to select one of said communication links to use to start a transaction, in dependence upon said priority determined by said monitor.

20. An envoy device according to claim 19, wherein said envoy device is configured to transmit to said further device information regarding said at least one longer range link.

21. An envoy device according to claim 19, wherein said monitor is configured to prioritise said communication links in dependence upon current energy requirements of said communication links.

22. An envoy device according to claim 21, wherein said monitor is configured to prioritise said communication links in dependence upon current battery capacity.

23. An envoy device according to claim 21, wherein said monitor is configured to prioritise said communication links in dependence upon current availability of said communication links.

* * * * *